UNITED STATES PATENT OFFICE.

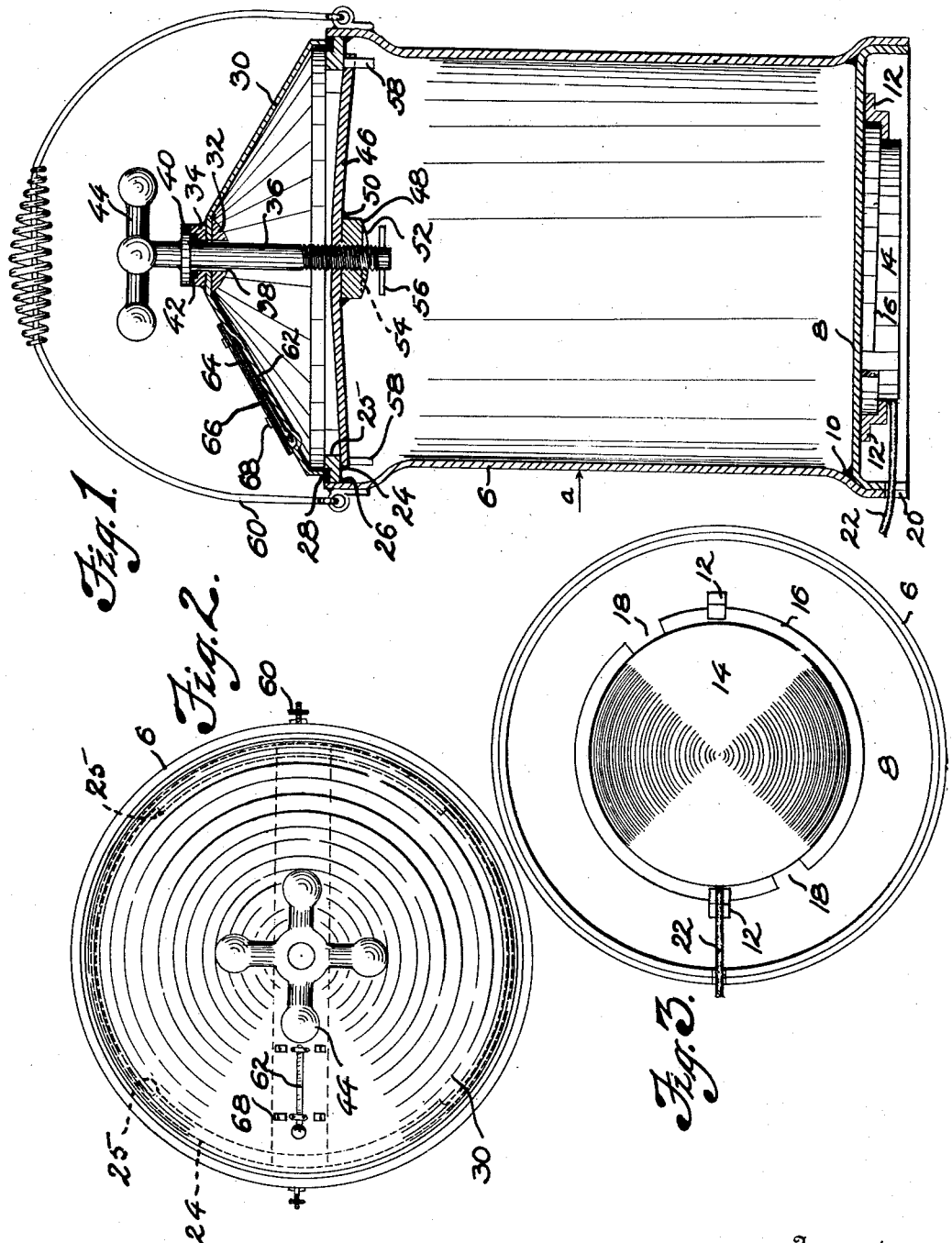

HENRY R. SPANGLER, OF DENVER, COLORADO.

PRESSURE-COOKER.

1,391,863.  Specification of Letters Patent.  Patented Sept. 27, 1921.

Application filed July 21, 1919. Serial No. 312,415.

*To all whom it may concern:*

Be it known that I, HENRY R. SPANGLER, a citizen of the United States, residing at the city and county of Denver and State of Colorado, have invented certain new and useful Improvements in Pressure-Cookers; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a pressure cooker which shall be simple, easy to keep in order, and cheap to manufacture.

Briefly, the invention comprises a container having a bottom equipped to receive an electric heater and at the same time adapted to be placed over an open flame. The top of the container is provided with a cover to retain the pressure, and this pressure against the bottom of the cooker urges it into firm engagement with the heater which insures better heat transmission. At the same time a silver plating on the walls of the container insures better transmission of the heat up the side walls and thence to the contents.

In the drawings:

Figure 1 is a vertical section.

Fig. 2 is a plan with the bail omitted.

Fig. 3 is a view of the under side of the bottom of the container with an electric heater in position.

The cooker comprises a container 6 having a bottom 8 soldered or welded in position, as indicated at 10. Brackets 12 are positioned on the under side of the bottom to support an electric heater 14 provided with a flange 16, cut away at opposite points, as indicated at 18, to receive the brackets 12. A notch 20 is formed in the side of the container at the bottom to receive an electric conductor 22. When the heater 14 is turned into place against the bottom of the cooker and pressure is produced within the cooker, the bottom will be forced downward slightly at the middle so as to produce a firm close contact between the heater and said bottom, due to the curvature thus produced in the bottom, thereby giving greater heating efficiency.

At the upper edge of the container, and within the same, an annular rim 24 is provided, this rim having on opposite sides inwardly projecting ledges 25 of considerable extent. The rim is secured in place by soldering or welding, as indicated at 26.

An annular lead gasket 28 is embedded in the upper face of the rim. The purpose of this gasket 28 is to receive the lower edge of the cover 30. The cover is reinforced at the top and on the inner side thereof, as indicated at 32, and a boss is welded to the upper side of the casing opposite the reinforcement 32. A spindle 36 passes through the reinforcement 32, the cover 30 and the boss 34 with appreciable clearance, as indicated at 38. The spindle is provided with a fixed flange 40, which normally bears on a gasket of asbestos or other suitable material to form an air-tight joint. The top of the spindle 36 is provided with a handle 44. The lower end of the spindle is threaded through a heavy spring 46 to the under side of which a reinforcing boss 48 is secured as by soldering 50. The under face of the boss 48 is provided with opposite shoulders 52 and 54 facing in opposite directions. These shoulders are adapted to be engaged by a pin 56 in the lower end of the spindle 36, for a purpose hereinafter described.

The under faces of the ledges 25 are provided with depending stops 58 to be engaged by the ends of the spring 46. The container is provided with a bail 60 and the cover is provided with a depression 62 which receives a thermometer 64, held to the cover by clips as indicated. In order to protect the thermometer a sliding plate 66 may be employed, this plate being retained by means of lugs 68. In Fig 2 the plate 66 is omitted.

To increase the thermal efficiency of the apparatus, the walls of the container are silver plated inside and outside upwardly from the bottom approximately to the point indicated by the small arrow *a* in Fig. 1. The inner or upper face of the bottom 8 of the container is also silver plated for the same purpose. By thus silver plating the sides and bottom of the container, the heat is more readily conducted away from the electric heater on the bottom and transmitted to the contents of the cooker.

In using this cooker the spindle 36 is threaded up through the spring 46 until the pin 56 engages the shoulders 52 and 54, the spring under these conditions being straight. The cover is then placed in position, the ends of the springs passing between the opposite ends of the ledges 25, and the cover is seated upon the gasket 28. The spring 46 will then lie below the rim 24. Rotation of the spindle 36 will carry the spring 46 under the ledges 25 until the ends of the spring engage the stops 58. Continued rotation of the spindle will cause the threaded end to move in the spring, gradually tensioning the spring and causing it to flex, as shown in Fig. 1. The turning of the spindle will be continued until the proper tension, determined by the number of rotations, is placed upon the spring to give the desired pressure within the cooker.

Heat may be applied either through the electric heater, as shown, or the electric heater may be removed and the device set over an open flame. When the pressure exceeds that determined by the spring, either the cover will be lifted and the pressure will blow off between the cover and the lead gasket 28, or the pressure will be transmitted through the clearance space 38 to the flange 40, lifting the latter from the gasket 42 sufficiently to relieve the pressure within the cooker.

When it is desired to remove the cover 30, the spindle 36 is rotated in a direction to relieve tension on the spring 46 and rotation is continued until the pin 56 engages the shoulders 52 and 54. This will then cause the spring 46 to move away from the stops 58 and out from under the ledges 25, whereupon the lid may be lifted from the container.

I claim:

1. In a pressure cooker, a container, a cover therefor to maintain pressure, retaining devices on the bottom of the cooker, and an electric heater held by said devices in close engagement with the bottom of said container, whereby pressure within the container against said bottom increases and maintains the said close engagement by reason of curvature produced in said bottom by the pressure within the cooker.

2. In a pressure cooker, a container, a cover therefor to maintain pressure, retaining devices on the bottom of the cooker, and an electric heater removably held by said devices in close engagement with the bottom of said container, whereby pressure within the container against said bottom increases and maintains the said close engagement by reason of curvature produced in said bottom by the pressure within the cooker.

In testimony whereof I affix my signature.

HENRY R. SPANGLER.